United States Patent [19]

Douglas

[11] Patent Number: 4,974,805
[45] Date of Patent: Dec. 4, 1990

[54] CLIPBOARD FOR STEERING WHEEL

[76] Inventor: Cameron F. Douglas, 310 Love Dr., Monroe, La. 71203

[21] Appl. No.: 297,309

[22] Filed: Jan. 17, 1989

[51] Int. Cl.$^5$ .............................................. B60R 7/08
[52] U.S. Cl. .................................. 248/447.1; 108/44; 224/276
[58] Field of Search ............... 248/441.1, 213.2, 447.1, 248/452, 450, 359 F; 108/44; 224/276, 277; 281/42, 45

[56] References Cited

U.S. PATENT DOCUMENTS

| | | | |
|---|---|---|---|
| D. 257,589 | 12/1980 | Shaffert | 248/447.1 |
| 1,977,507 | 10/1934 | Edwards | 224/276 |
| 2,150,709 | 3/1939 | Bake . | |
| 2,621,945 | 12/1952 | Cooper | 281/45 |
| 2,663,576 | 12/1953 | Berman | 224/277 |
| 2,749,655 | 6/1956 | Ashton . | |
| 2,810,221 | 10/1957 | Reifsnyder | 224/277 |
| 3,074,745 | 1/1963 | Burckhalter . | |
| 3,281,109 | 10/1966 | Levandowski | 248/447.1 |
| 3,643,606 | 2/1972 | Vise . | |
| 3,739,478 | 6/1973 | Elenberger . | |
| 3,952,988 | 4/1976 | Easterly . | |
| 4,139,217 | 2/1979 | Jamison | 224/276 |
| 4,243,249 | 1/1981 | Goss | 281/45 |
| 4,375,881 | 3/1983 | Mitchell . | |
| 4,453,788 | 6/1984 | Russell . | |
| 4,501,438 | 2/1985 | McKee | 281/45 |

FOREIGN PATENT DOCUMENTS

| | | | |
|---|---|---|---|
| 250192 | 2/1966 | Austria | 108/44 |
| 552891 | 2/1958 | Canada | 108/44 |
| 1416622 | 9/1965 | France | 108/44 |
| 1383609 | 2/1975 | United Kingdom | 248/447.1 |
| 1550899 | 8/1979 | United Kingdom | 108/44 |

OTHER PUBLICATIONS

Taylor Gift Catalog, "Auto Pad", vol. 1, p. 67, 1989.

Primary Examiner—Ramon O. Ramirez
Assistant Examiner—Robert A. Olson
Attorney, Agent, or Firm—John M. Harrison

[57] ABSTRACT

A clipboard for removably mounting on the steering wheel of a vehicle, as well as a boat, which clipboard includes a flat support plate provided with a top flange having a slot for receiving a top segment of the steering wheel and a bottom flange terminating the bottom end of the plate for engaging a bottom portion of the steering wheel. A center clip is attached to the upper center portion of the support plate and one or more side clips can also be secured to the support plate on one or both sides of the center clip or elsewhere on the support plate, as desired.

4 Claims, 1 Drawing Sheet

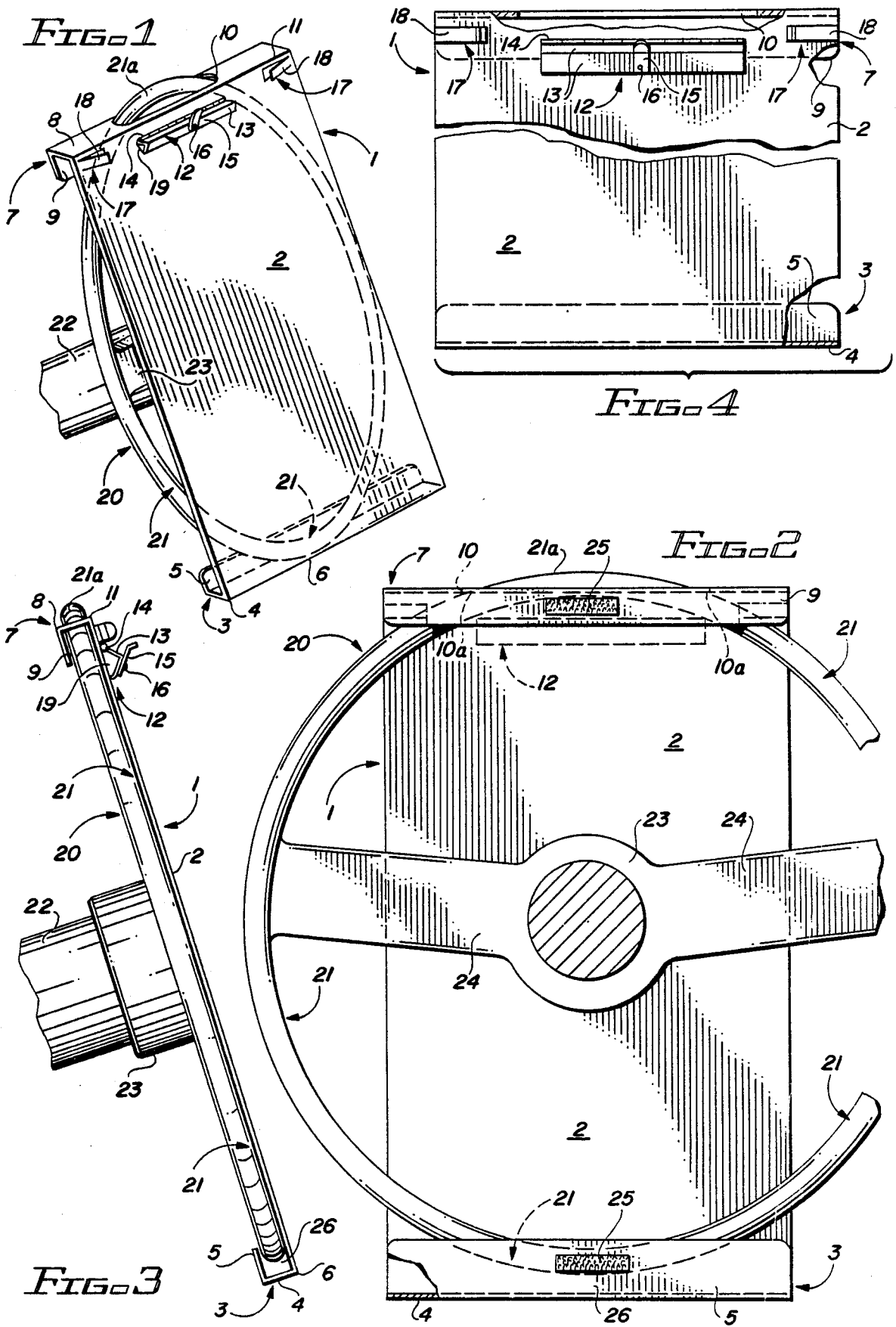

CLIPBOARD FOR STEERING WHEEL

BACKGROUND OF THE INVENTION

1. Field of the Invention

This invention relates to clipboards and portable writing desks for use in vehicles and boats, and more particularly, to a clipboard which incorporates a one-piece attachment and support means designed for removable attachment to steering wheels of various diameter. In a preferred embodiment, the clipboard is characterized by a flat plate provided with a top flange and a bottom flange for engaging upper and lower portions of the steering wheel, respectively, which top flange is fitted with a slot for stabilizing the clipboard on the steering wheel. A spring-loaded center clip is attached to the upper center portion of the flat plate and one or more spring-loaded side clips may also be provided on the support plate for clipping various items such as writing paper, tablets, paper sheets, note pads, maps and the like, to the clipboard. The clipboard is designed to be shaped from a single piece of metal or molded in one piece from a plastic material for quick and easy attachment to and removal from the steering wheel of a boat, automobile or other vehicle, without the necessity of using intricate and complicated attachment mechanisms.

Certain vocations require the use of clipboards or other portable desk means for writing and sketching in a boat or vehicle while driving slowly or while the boat or vehicle is parked. For example, oil and gas field operations frequently require the use of portable desks or clipboards in automobiles and trucks, in order to make notations, including field notes and sketches, relating to oil and gas operations. It is sometimes convenient to make such notations while the vehicle is in motion and the use of conventional clipboards or portable desks for this purpose is cumbersome and can be dangerous, since the driver may be distracted from the field of vision ahead by turning his head downwardly to the seat or other support which is used to mount a note pad or tablet. Furthermore, conventional clipboards are not designed to mount on the steering wheel of a vehicle, thereby rendering secure location of such a clipboard against the steering wheel for writing or reviewing purposes while riding, difficult, particularly while the vehicle is in motion.

2. Description of the Prior Art

Various types of portable clipboards and desks for use in vehicles are well known in the art. An early "Automobile Steering Wheel Attachment" is detailed in U.S. Pat. No. 2,150,709, dated Mar. 14, 1939, to C. F. Bake. The Bake patent details a modified clipboard which is provided with upwardly and downwardly-extending, curved arms, the bottom arm of which is adjustable, for removably engaging the steering wheel of an automobile. A "Portable Desk" is detailed in U.S. Pat. No. 2,749,655, dated Jun. 12, 1956, to E. D. Ashton. The portable desk includes a hinged plate provided with a frame for mounting the plate on the rim of a steering wheel, wherein notes can be made while the driver is operating the vehicle. U.S. Pat. No. 3,074,745, dated Jan. 22, 1963, to A. R. Burckhalter, discloses a "Portable Desk" which includes a flat plate provided with a horizontally-oriented book support and a cooperating wire clip that serves both to support a book and removably mount the frame on the steering wheel of a vehicle. A "Table Structure for Use in Motor Vehicles" is detailed in U.S. Pat. No. 3,643,606, dated Feb. 22, 1972, to M. J. Vise. The table structure is designed for suspension on the steering wheel of a motor vehicle and includes two table sections which are hinged together and selectively foldable toward and away from each other into multiple positions. The table sections are adjustable and the back of the table structure is provided with multiple bearing devices, each being adapted to selectively suspend the table structure at a different height on a steering wheel. A "Steering Wheel Mounted Clipboard" is detailed in U.S. Pat. No. 3,739,478, dated Jun. 19, 1973, to Richard V. Elenberger. The clipboard is designed for detachable connection to the steering wheel of an automobile, in order to provide a firm base for the preparation of field sketches and notes in a motor vehicle. The clipboard includes a circular base plate having radially-oriented, adjustable spring clips secured thereto for removably snapping over a steering wheel. A circular board is secured to the base plate by means of an axial pivot pin to permit the board to rotate on the plate. A spring-pressed clamp is provided on the edge of the board for securing papers to the board and an optional feature includes a protractor provided on the board for use by an Engineer in making sketches. U.S. Pat. No. 3,952,988, dated Apr. 27, 1976, to Herbert D. Easterly, details a "Steering Wheel Mounted Desk Board". The desk board is designed for mounting on a truck steering wheel having a central hub, an outer peripheral rim, multiple spokes extending radially outwardly from the hub to support the rim and a horn button on the hub extending axially above the level of the rim. The desk board includes a flat, upwardly-facing work surface and a downwardly-facing mounting surface. The mounting surface is contoured to provide a downwardly-opening recess for receiving the horn button in the upper portion of the hub and a downwardly-projecting apparatus for engaging the top of the wheel rim to secure the board on the wheel. A "Portable Desk For Use With Automobile Steering Wheel" is detailed in U.S. Pat. No. 4,375,881, dated Mar. 8, 1983, to Stephen A. Mitchell. The portable desk is thin, compact and reversible, and is designed for attachment to the rim of an automobile or truck steering wheel. The portable desk also includes a pocket for holding index cards and other small items. Another "Portable Desk" is detailed in U.S. Pat. No. 4,453,788, dated Jun. 12, 1984, to Jack M. Russell. The desk is designed for use on a vehicle steering wheel and a flat surface is provided for resting against the steering wheel, along with multiple hooks extending from the flat surface for engagement with the rim of the steering wheel. A writing surface is disposed in spaced relationship with respect to the flat surface and is inclined in the same direction as the steering wheel. The writing surface is hinged to provide access to an inner cavity which holds papers, writing instruments and the like. The portable writing desk may also be used in the lap of a person or on a flat surface and thus provides an inclined writing surface that is comfortable and convenient. An "Auto Pad" is advertised for sale on page 67 in the 1989, Volume 1 issue of "Taylor Gifts" catalog published by Taylor Gifts, Inc., P.O. Box 206, Wayne, Pa. 19087-0206. The "Auto Pad" is advertised in the "Auto Aids" section of the catalog, is constructed of ABS plastic and includes a pair of top engaging members shaped to mount the device on a steering wheel. A centrally-located clip is molded or shaped in the Auto Pad support member for receiving a memo pad.

It is an object of this invention to provide a simple, yet functional and utilitarian removable clipboard having a one-piece attachment configuration for mounting on a steering wheel.

Another object of this invention is to provide a flanged clipboard for mounting on the steering wheel of a boat or vehicle and clipping notes, sketch pads, maps and other material thereto, for reviewing, writing or sketching purposes, while the boat or vehicle is either parked or moving.

Still another object of this invention is to provide a new and improved clipboard for mounting on the steering wheel of a vehicle, which clipboard is characterized by a flat writing surface, a top flange terminating the upper end of the writing surface and provided with a leg slot for receiving an upper portion of the rim of the steering wheel and a bottom flange designed to engage a bottom portion of the rim of the steering wheel, for removably stabilizing the clipboard on the steering wheel.

Yet another object of this invention is to provide a metal or plastic clipboard for removable mounting on the steering wheel of a boat or vehicle, which clipboard includes a flat writing surface provided with one or more spring-loaded clips and terminated at the top edge by an integrally formed, generally L-shaped top flange having a slot for receiving a top arcuate portion of the steering wheel, which writing surface is terminated at the bottom edge by a corresponding integrally formed, generally L-shaped bottom flange, for receiving or resting on a bottom portion of the steering wheel and stabilizing the clipboard in removable fashion on the steering wheel.

SUMMARY OF THE INVENTION

These and other objects of the invention are provided in a new and improved clipboard having a one-piece attachment plate for removably mounting the clipboard on a steering wheel, which attachment plate includes a flat writing plate adapted for seating on the steering wheel, a generally L-shaped top flange shaped in the top edge of the writing plate and provided with a slot for receiving a top arcuate portion of the rim of the steering wheel and a generally L-shaped bottom flange spaced from the top flange and shaped in the bottom edge of the writing plate, which bottom flange is designed to engage or rest against a bottom portion of the steering wheel rim, and further including one or more spring-loaded clips attached to the writing plate for receiving notepads, maps and other necessary material.

BRIEF DESCRIPTION OF THE DRAWING

The invention will be better understood by reference to the accompanying drawing, wherein:

FIG. 1 is a perspective view of a preferred embodiment of the clipboard of this invention, mounted in functional configuration on the steering wheel of a vehicle;

FIG. 2 is a bottom view, partially in section, of the mounted clipboard illustrated in FIG. 1;

FIG. 3 is a left side view of the mounted clipboard illustrated in FIG. 1; and

FIG. 4 is a top view, partially in section, of the clipboard illustrated in FIGS. 1-3, removed from the steering wheel of the vehicle.

DESCRIPTION OF THE PREFERRED EMBODIMENTS

Referring to the drawing, the clipboard of this invention is generally illustrated by reference numeral 1. The clipboard 1 includes a rectangular, flat support plate 2, which is designed to span a portion of the rim 21 of a conventional steering wheel 20 and is terminated at the bottom edge by a bottom flange 3 and at the top edge by a top flange 7. The bottom flange 3 is further characterized by a bottom flange leg 4, which projects from the support plate bottom edge 6 at substantially a 90-degree angle and a cooperating bottom flange lip 5, which projects upwardly from the bottom flange leg 4 in parallel relationship with the support plate 2, as illustrated in the drawing. Similarly, the top flange leg 8 extends from a support plate top edge 11 of the support plate 2 in substantially 90-degree angular relationship and is terminated by a downwardly-extending top flange lip 9, as further illustrated in the drawing. An elongated leg slot 10 is provided in the top flange leg 8, in order to receive an arcuate top rim portion 21a of the rim 21 of the steering wheel 20, as illustrated in FIGS. 1-3 of the drawing. Accordingly, referring again to FIGS. 1-3 of the drawing, the clipboard 1 is designed such that the top rim portion 21a projects through the leg slot 10 as the support plate 2 of the clipboard 1 is pressed against the rim 21 and is moved downwardly, in the manner hereinafter described. The distance between the bottom flange leg 4 of the bottom flange 3 and the top flange leg 8 of the top flange 7 is sufficient to facilitate engagement of the rim 21 of most vehicles, wherein extension of the top rim portion 21a through the leg slot 10 and insertion of the bottom portion of the rim 21 in the bottom flange 3 effect resting of the support plate 2 against the rim 21, as illustrated in FIGS. 1-3. Accordingly, it will be appreciated that the clipboard 1 is securely, yet removably attached to the steering wheel 20 and will not inadvertently fall from the rim 21 while the steering wheel 20 is turned in either direction by an operator. This stability is reinforced by the design of the leg slot 10, which is provided with 90 degree slot edges 10a, as illustrated in FIG. 2, for engaging the rim 21 at two points that define the top rim portion 21a. Under circumstances where the diameter of the rim 21 of the steering wheel 20 is larger than the distance between the bottom flange leg 4 and the top flange leg 8, the top flange 7 is engaged with the rim 21 as described above, while the bottom flange lip 5 of the bottom flange 3 rests on the bottom portion of the rim 21 and the support plate 2 is angularly oriented on the rim 21, which adjusts the writing angle of the clipboard 1.

As further illustrated in FIGS. 1, 3 and 4, the center clip jaw 13 of a center clip 12 is attached to a center clip hinge 14, mounted to the support plate 2 by means of a bottom jaw 19, using suitable fasteners such as brads (not illustrated). A jaw lever 15 is pivotally attached to the center clip jaw 13 by means of a lever pivot pin 16, in order to selectively displace the free edge of the center clip jaw 13 from the support plate 2 by manipulating the jaw lever 15. A pair of side clips 17, each having a spring-loaded side clip jaw 18, are also provided on the support plate 2 on each side of the center clip 12. Alternatively, a single side clip 17 may be provided, as desired, and the side clips 17 may also be secured to the support plate 2 by means of fasteners such as brads or the like. (not illustrated) In a preferred embodiment of the invention a strip of loop element 25 of a loop-pile fastener (the pile element of which is not illustrated), is glued or otherwise attached to the outside surface of the top flange lip 9 of the top flange 7, in order to selectively engage a cooperating pile element and mount the clipboard 1 to the dash, seat or other area of the vehicle.

Referring again to the drawing, the clipboard 1 is installed on the rim 21 of the steering wheel 20 and projects over the hub 23 and hub spokes 24, supported by the steering column 22, as follows. The clipboard 1 is initially positioned in the plane of the rim 21, such that the top rim portion 21a is aligned with the top flange 7 and the oppositely-disposed bottom portion of the rim 21 is aligned with the bottom flange 3, in side-by-side relationship. As heretofore described, the distance between the top flange leg 8 and the bottom flange leg 4 is chosen such that the top flange 7 will clear the top rim portion 21a and the bottom flange leg 4 will clear the bottom edge of the rim 21 in most vehicles at a vertical diameter across the rim 21, extending from the top rim portion 21a. The clipboard 1 is then moved toward the steering wheel 20 in coplanar relationship to align the top flange 7 and bottom flange 3 with the top rim portion 21a and the opposite segment of the rim 21 of the steering wheel 20, respectively, as illustrated in FIGS. 1–3. The clipboard 1 is subsequently lowered to extend the top rim portion 21a of the rim 21 through the leg slot 10, as further illustrated in FIGS. 1–3. This action creates a space 26 between the bottom segment of the rim 21 and the bottom flange leg 4, as the slot edges 10a of the slot 10 engage the rim 21, such that movement of the steering wheel 20 in either the clockwise or counterclockwise direction will not dislodge the clipboard 1 from the rim 21.

Under circumstances where the diameter of the steering wheel 20 exceeds the distance between the bottom flange leg 4 and the top flange leg 8, as in the case of older vehicles, the clipboard 1 is manipulated such that the top flange 7 engages the top rim portion 21a, with the bottom flange 3 lifted above the corresponding lower segment of the rim 21. The clipboard 1 can then be lowered to place the top rim portion 21a in the leg slot 10, while the bottom flange lip 5 rests against the corresponding lower segment of the rim 21.

It will be appreciated by those skilled in the art that the clipboard 1 can be constructed from various materials such as metal, fiberglass, plastic materials of various composition and like materials. A particularly desirable material of construction is aluminum, due to the lightness of weight and ease of workmanship. Injection-moldable plastic materials such as ABS plastic, polyethylene and polypropylene, in non-exclusive particular, may also be used to construct the clipboard 1. It is understood that in the case of metal as a material of construction, both the top flange 7 and bottom flange 3 are preferably shaped integrally with the support plate 2 using bending jigs and tools of appropriate design, according to the knowledge of those skilled in the art. Moreover, suitable plastic materials can be injection-molded in properly designed molds to shape the top flange 7, bottom flange 3 and support plate 2 in one piece. In each case, a conventional or specially designed center clip 12 and/or one or more side clips 17 can be mounted on the support plate 2 in a desired location or locations. While preferred dimensions for the support plate 2 of the clipboard 1 are 9 inches in width and 14 inches in length, in order to facilitate using both letter-size and legal-size paper or note pads in the clipboard 1, it will be appreciated that the support plate 2 can be constructed in any desired size and shape.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A clipboard for mounting on a steering wheel, comprising a substantially flat support plate, at least one clip means carried by said support plate for removably clipping material to said support plate; a generally L-shaped, rearwardly extending, bottom-engaging member integrally provided on the bottom end of said support plate, said bottom engaging member adapted to engage a bottom segment of the steering wheel; top engaging means integrally provided on the top end of said support plate, said top engaging means comprising a rearwardly extending first flange disposed perpendicularly from a top edge of said support, and a second flange extending perpendicularly from an end of said first flange, and a slot provided in said first flange for receiving a top segment of the steering wheel, said slot terminated by a pair of oppositely-disposed, curved slot margins, whereby said top flange means is adapted to engage the steering wheel at said slot margins, and said slot margins define the length of the top segment of the steering wheel adapted to project through said slot, for stabilizing said clipboard on the steering wheel.

2. The clipboard of claim 1 wherein said at least one clip means further comprises a spring-loaded center clip fixedly mounted on the upper center of said support plate and at least one spring-loaded side clip fixedly mounted in off-center relationship on said support plate.

3. The clipboard of claim 1 wherein said at least one clip means further comprises a spring-loaded center clip fixedly mounted on the upper center of said support plate and a pair of spring-loaded side clips fixedly mounted in off-center relationship on said support plate on either side of said center clip.

4. A clipboard for mounting on a steering wheel, comprising a generally rectangular, substantially flat support plate, a spring-loaded center clip fixedly attached to said support plate at the upper center of said support plate; a pair of spring-loaded side clips fixedly attached to said support plate on each side of said center clip, respectively; a generally L-shaped, rearwardly extending bottom flange integrally provided on the bottom end of said support plate and adapted to engage a bottom segment of the steering wheel; a generally L-shaped top engaging member integrally provided on the top end of said support plate, said top engaging member comprising a rearwardly extending first flange disposed perpendicularly from a top edge of said support, and a second flange extending perpendicularly from an end of said first flange, and a slot provided in said first flange for receiving a top segment of the steering wheel, said slot terminated at each end by curved slot margins, whereby said top flange is adapted to engage the steering wheel at said curved slot margins, for stabilizing said clipboard on the steering wheel.

* * * * *